April 5, 1955   V. M. YOUNG   2,705,586
SAFETY SLING FOR OCCUPANTS OF AIRCRAFT
Filed May 21, 1949   3 Sheets-Sheet 1
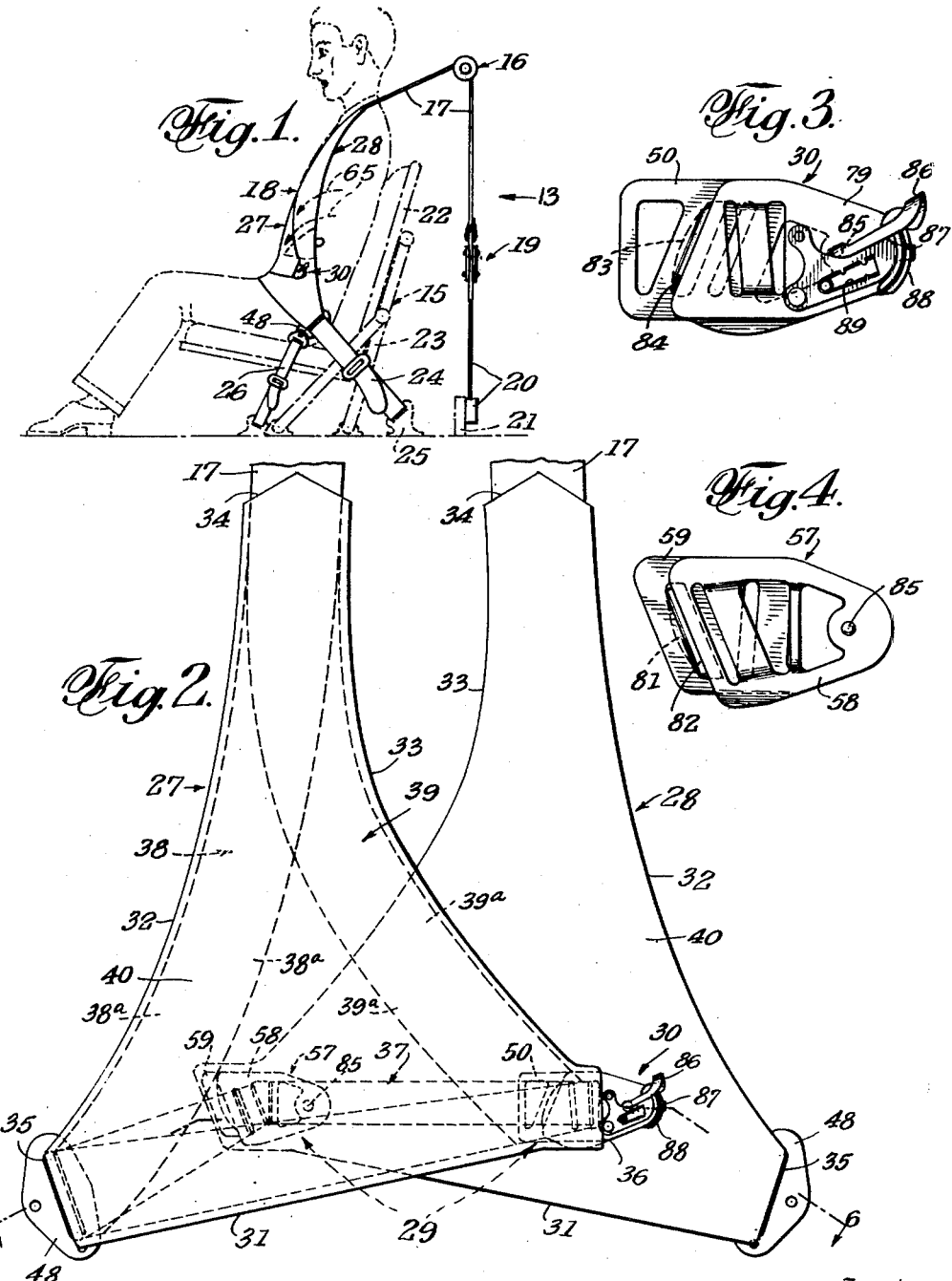
Inventor
VICTOR M. YOUNG
By
L. G. Stratton
Attorney April 5, 1955 V. M. YOUNG 2,705,586
SAFETY SLING FOR OCCUPANTS OF AIRCRAFT
Filed May 21, 1949 3 Sheets-Sheet 2
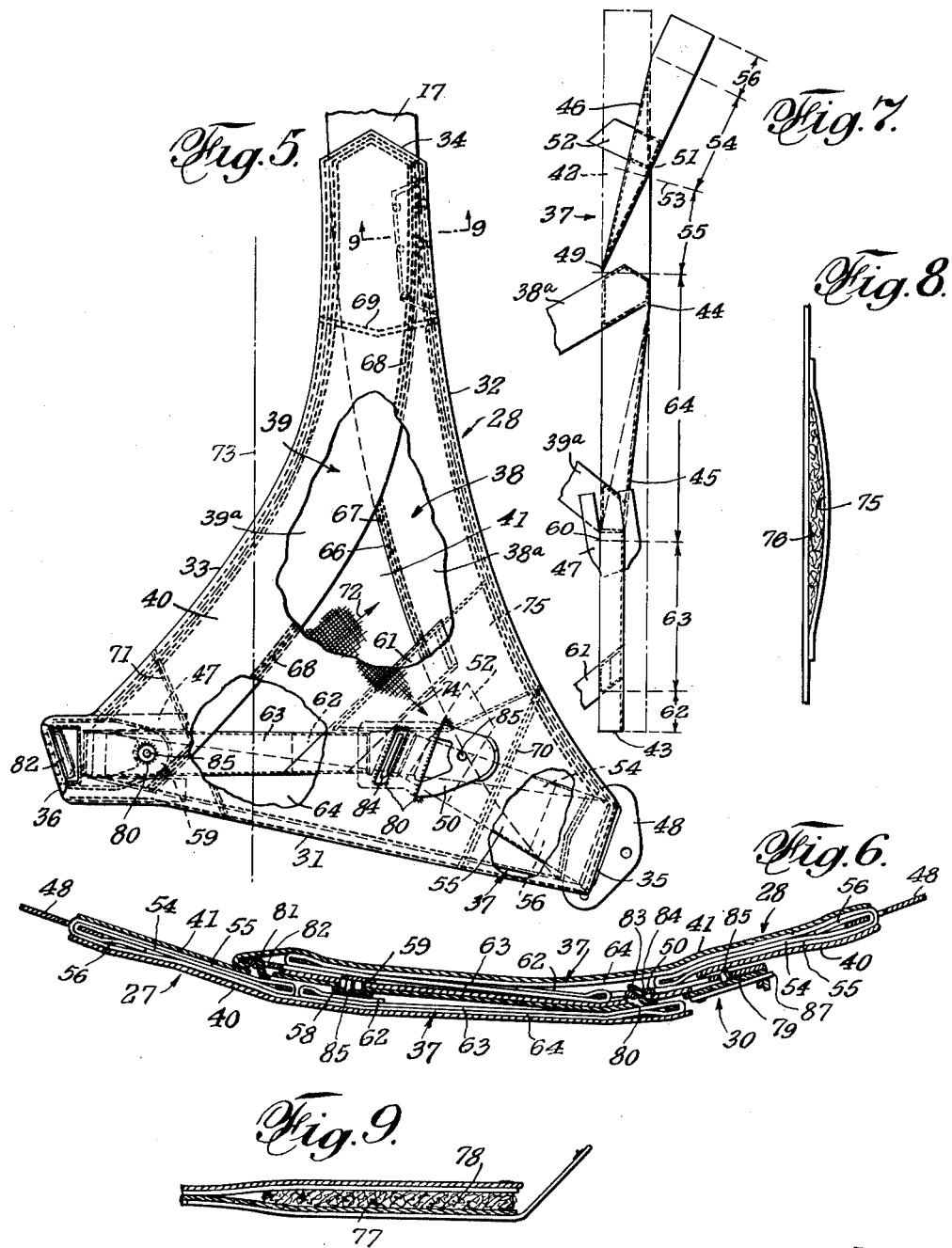
Inventor
VICTOR M. YOUNG
By C. G. Stratton
Attorney April 5, 1955  V. M. YOUNG  2,705,586
SAFETY SLING FOR OCCUPANTS OF AIRCRAFT
Filed May 21, 1949  3 Sheets-Sheet 3
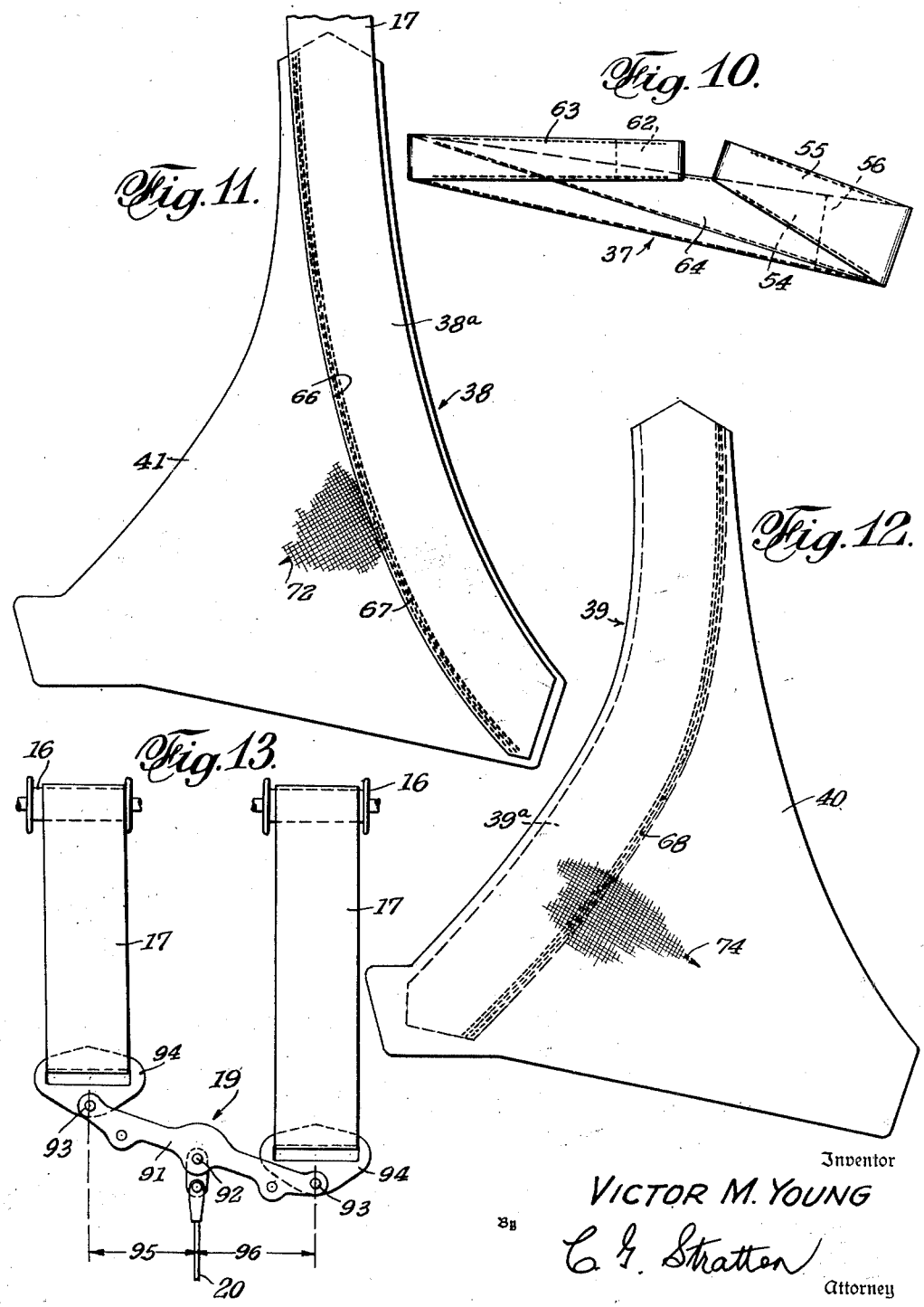
Inventor
VICTOR M. YOUNG
C. G. Stratten
Attorney United States Patent Office 2,705,586
Patented Apr. 5, 1955

2,705,586

SAFETY SLING FOR OCCUPANTS OF AIRCRAFT

Victor M. Young, Huntington Park, Calif.

Application May 21, 1949, Serial No. 94,685

16 Claims. (Cl. 227—49)

This invention relates to improvements in restraining devices for use by operators and passengers of aircraft and other high speed vehicles, and to releasable means therefor.

When the human body, while moving at a high speed, is suddenly arrested, the same is forced to conform to the shape and be constrained by the action of an arresting or restraining device. Since all members and internal organs of the body are flexible, unless properly restrained, they will respond in movement to forces of inertia to which they are subjected. The internal organs of the thorax and abdomen are freely suspended, the walls of their respective cavities maintaining them in position. Consequently, during an impact resulting from a sudden deceleration, the forces acting on the internal organs cause them to move and be forwardly compressed against the forward and side walls of the thorax and abdomen cavities. When in a normally seated position, the angular disposition of these walls relative to the line of motion of the organs is such that the latter will be deflected in a downward direction and inward toward the vertical center of the torso. Unless the body is properly restrained, there will be a reactive force tending to lift the body relative to the organs, resulting in said organs seeking a lowered position within the torso. Also, unless provision is made for proper restraint, backward bending of the torso will result.

An object of the present invention, therefore, is to provide a safety sling that is readily adapted to all conditions of installation, which will act as a proper restraining container for the body of the user, and is self-adjusting to comfortably conform to the torso and maintain such conformity when the torso is subjected to the impact of suddenly decelerating forces.

Another object of the invention is to provide a safety sling that embodies shoulder-restraining means which, during impact, has positive restraining action to prevent the user from being thrown upward as may be caused by a pitching motion during normal operation and also prevents the user from being lifted upward by the pulling action of said shoulder-restraining means.

Another object of the invention is to provide a safety sling that provides for freedom of movement of the upper part of the body during normal operation and provides for limited forward movement thereof, during impact, and, thereby, smooths out the peaks of the impact forces for the protection of the head and neck and also reduces the effect of vibration on the body.

A further object of the invention is to provide a safety sling that so restrains the abdominal sac in the area of the pelvis as to prevent distention and, thereby, possible rupture of the muscles of the lower walls of the abdomen.

A further object of the invention is to provide a safety sling which will exert a downward restraining force on the upper portion of the thighs of the user.

A further object of the invention is to provide a safety sling that provides compression over the hip joints to prevent injury thereto due to pull caused by the inertia forces on the legs of the user.

A further object of the invention is to provide a safety sling that embodies shoulder-restraining elements and which will transmit the forces collected by said elements directly to the anchorages thereof to reduce the degree of force transmitted across the body of the user, and, thereby, reduce body shock and also the degree of load on the lap-restraining portion of the sling and on releasable means operatively holding the sling in assembly.

A further object of the invention is to provide a safety sling with shoulder-restraining means so constructed that the resultant force of the upper body, in combination with the action of the sling over the abdomen, will maintain the torso in its normally erect attitude during impact.

A further object of the invention is to provide a safety sling embodying shoulder strap extensions that are trained rearward from the shoulders and thence downward over guide means, and to so connect the ends of said straps that compensation for free movement of the upper part of the body is afforded while maintaining proper alignment with said guide means during the full range of movement of the body. Since the ends of said straps are ultimately connected to conventional self-adjusting strap-retrieving means fixed to the vehicle, the herein-contemplated novel strap-connecting means comprises a compensator or equalizer so that reasonable twisting movements of the body can be had without affecting said retrieving means.

A still further object of the invention is to provide a safety sling that produces an upward and lateral smoothening action over the forward sides of the abdomen to counteract the above-mentioned downward and compressive movement of the internal organs of the body, resulting in a holding action over the abdomen that maintains support of the diaphragm, said diaphragm serving as a supporting floor for the internal organs thereabove.

A still further object of the invention is to provide a safety sling having restraining means so arranged as not to unduly depress the forward wall of the abdomen, thereby preventing injury to the internal organs or severe shock to the solar plexis.

A still further object of the invention is to provide a safety sling that embodies a bearing over the line where the false ribs are joined to the costal cartilages to maintain alignment of such articulations.

A still further object of the invention is to provide, in a safety sling, pad means for protecting the clavicles of the user against concentrated forces and also serving as means for distributing the forces on the areas of the upper chest when the sling is worn over the narrower shoulder webbing of a parachute harness, similar padding means being contemplated to prevent undue distention of the hollowed areas above the hips.

A still further object of the present invention is to provide a safety sling, as herein indicated, that embodies novel positive-holding and quick-release means for holding the sling in operative position, said means being so applied and so formed that a wide spread or distribution of the force lines is produced over the lower abdomen without loss in the effective width of the webbing connecting said means to the sling.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is an elevational view, as seen from the left side of a safety sling according to the present invention, and shown in use.

Fig. 2 is a front view, in flat condition, showing the sling illustrated in Fig. 1.

Fig. 3 is an outer face view of a releasable latch used for connecting the components of the sling.

Fig. 4 is a similar view of release links also connecting the components of the sling.

Fig. 5 is an outer face view, partly broken, of the sling component that engages the left side of the user.

Fig. 6 is an enlarged cross-sectional view, as taken substantially along line 6—6 of Fig. 2.

Fig. 7 is a face view showing a partially folded condition of the lap section of Fig. 6.

Fig. 8 is an enlarged edge view of a padding pocket formed in each component of the sling to engage above the hip joint of the user.

Fig. 9 is an enlarged section view, taken on line 9—9 of Fig. 5.

Fig. 10 is a face view of the lap section of the sling component shown in Fig. 5.

Fig. 11 is a similar view of the shoulder strap section.

Fig. 12 is a similar view of the chest strap section.

Fig. 13 is a rear view, to an enlarged scale, as seen in the direction of arrow 13 of Fig. 1.

The present sling may be adapted to various installations. If the seat 15 (Fig. 1) is sufficiently sturdy, the sling may be attached thereto. As shown, however, the sling is connected to suitable portions of an aircraft or other high speed vehicle or conveyance to have such relationship to seat 15 as to hold a person in said seat in keeping with the purposes of the invention. Accordingly, at 16 there is shown means, such as a flanged pulley device, over which the shoulder straps 17 of the sling 18 are trained. Link means 19 at the ends of said straps (see Fig. 13) through the medium of automatic or manually operable yieldable means, indicated at 20, are affixed to an anchorage 21 that comprises a sturdy part of the aircraft. The points of attachment of elements 16, 20 and 21 may be varied so long as their position relative to the seat is maintained. For instance, the shoulder straps may be trained over the shoulders and attached to the seat back 22 or to the seat support frame 23, the intent being to restrain forward movement of the upper portion of the body.

Forward movement of the body and a portion of the upward movement is restrained through the medium of anchor straps 24, one connected to each side of sling 18 and securely anchored to the aircraft as by brackets 25. Such straps may be anchored directly to the seat, meeting strength requirements.

Upward movement of the body, additionally, is restrained by anchor straps 26 also attached to each side of safety sling 18, said latter straps extending approximately along lines from the shoulders, through their points of attachment, to the sling and downward and forward to the aircraft structure or to a seat of sufficient strength. It will be noted that anchor straps 26 have increasing importance to restrain upward movement when the seat cushion is relatively nearer to the points of anchorage of straps 24.

The present safety sling comprises, generally, two substantially similar chest, body and lap-engaging panels 27 and 28, each respectively fabricated to engage the right and left sides of the user, said panels, therefore, being opposites; and means 29 releasably connecting the panels. So that release may be effected with the right hand, left panel 28 is applied first and right panel 27 partly overlaps panel 28 to locate the latch release means 30 of the means 29 at the left. The two panels 27 and 28 are substantially alike. Accordingly, the following description of one will suffice to describe the other.

The sling panel is generally triangular in form, having a substantially straight bottom edge 31, an outer concavely curved edge 32, and an inner concavely curved edge 33, the latter two edges terminating at what may be termed the upper apex 34 of the panel. The other two apices 35 and 36 are formed at the jointure of edge 31 and edges 32 and 33, respectively. The panel, essentially comprises a lap section 37 (Fig. 10) that extends between apices 35 and 36 along the lower portion of the panel, a shoulder strap section 38 (Fig. 11), and a chest strap section 39 (Fig. 12). Sections 38 and 39 are superposed one on the other and, between them, confine lap section 37. An outer fabric cover 40 comprises part of section 39, and an inner fabric cover 41 comprises part of section 38.

The lap section 37 is made up of a continuous length of comparatively thin, high strength, firmly woven and mildew-resistant webbing 42, of nylon or equivalent material. Said length of webbing, as hereinafter explained, is folded transversely to provide a plurality of plies that are more numerous where strength in tension is required, and less numerous where strength is of lesser importance to eliminate undue bulk. Portions of said transversely folded web are also longitudinally and longitudinally angularly folded to provide the same with a desired shape, to provide for desired position of links thereon, to allow for threading said links, and to retain the full strength of the webbing.

As shown in Fig. 7, the webbing 42 is first longitudinally folded from its end 43 to a point 44 along a fold line 45. A line of stitching is then applied along said fold line. Said webbing is then folded and stitched along a line 46. To the longitudinally folded strip thus provided is sewed the lower end of chest strap section 39, the same comprising a length of webbing 39a. A fabric shield 47 for one of the release links of the release means 57 is then sewed in place substantially as shown. Said shield is placed between the rightward end of the associated release link and the user's body. The left end of said shield (Fig. 5) is turned up around the end of said link and is attached thereto by stitching passing through suitable holes provided in said link.

The lower end of shoulder strap section 38 is then stitched in place, the same also comprising a length of webbing similar to webbing 42. An attaching link 48 is then threaded on the webbing 42 to approximately the point 49. Release latch link 50 of the release means 30 is similarly threaded onto approximately the point 51. A short tie 52, comprising a strip of webbing is then sewed, as shown, to the webbing 42. The strip is then folded along a transverse line 53 and the section marked 54 is sewed to section 55. The end section 56 is then threaded through link 48 and sewed to sections 54 and 55.

The releasable connecting means 29, in addition to the release means 30, includes link means 57 comprising interconnected links 58 and 59. Of these, link 58 is carried by the lap section of the right panel 27 and link 59 by the lap section of panel 28. Accordingly, the link 59 is threaded onto webbing 42 to approximately a point 60. A longer attaching tie 61 is then stitched in place. Sections 62, 63 and 64 are threaded through link 59, section 62 folded over, after threading through link 50, and sewed to section 63. Sections 63 and 64 are then sewed together.

It will be noted that no portion of webbing 42 is cut and that the longitudinal folds maintain full width strength in narrow form and provide extra plies that afford increased strength. As can be seen from Fig. 2, the two lap sections 37 of the panels are arranged in arched form with the opposite attaching links 48 at the ends, the two webbing sections 64 intersecting at a shallow or obtuse angle, and the strong folded sections 63 being substantially superimposed one on the other straight across the middle of the lap section of the assembled sling. The angles thus formed between section 64 of each lap section and sections 54 and 55, on one side, and section 63 on the other, provide an arched structure that is adapted to fit across the abdomen with the upper edges thereof somewhat below the belt line of the user. The lower edge of the same folds forward and bears downward over the upper part of the thighs. The opposite ends 35 of the sling are thereby designed to fit over the thighs and extend outward, around and well back to a low position over the hips.

The upper ends of the ties 52 and 61 are sewed to the shoulder strap 38a of section 38 so that the arched lap section structure is held up in position by said section and so that the lower end of said section is firmly held against the hips when subjected to impact forces. Each link 48 of the lap section structure above set forth is provided with means for affixing the anchor strap 26. Thus the lap section structure comprises a rugged belt-like device that serves as a lap belt to restrain the user against forward movement at the hips and prevents the user from being thrown upward by pitching action or from being lifted by pull of the shoulder straps during the impact due to rapid deceleration. Since the lap section structure restrains the area of the body, when seated, that is at or near the center of gravity, said structure acts to immediately seal over the lower end of the abdominal sac where the same joins the pelvic cradle and thus supports the lower abdominal muscles to prevent distention and possible rupture under forces acting on the internal organs. The lap section structure provides a reactive upward pressure on the abdomen that offsets the tendency of the organs to move and be compressed downward as suggested by arrows 65 in Fig. 1.

The shoulder strap section 38 comprises a length of high strength mildew-resistant webbing 38a that has a weave which permits the same to be formed to an edgewise curve substantially as shown, the curvature being maintained by securely sewing the inner curved edge 66, by means of stitching 67, to inner cover 41. It will be noted that webbing 38a extends from the point of connection of attaching link 48 and, consequently, covers the joints where the false ribs join the costal cartilages, then extends upward to cover the frontal area of the chest outward of the lower end of the sternum, and then extends to the tip of the shoulder from which point the integral extension 17, and the connection 20 thereof, when trained over pulleys 16, provides for freedom of forward movement of the upper portion of the body during normal use, and restrained forward movement under conditions of impact.

The inner cover 41 is made of a lightweight, high strength, and mildew-resistant fabric cut to the triangular shape of the panel. A line of stitching 67 securely attaches the inner curved edge of shoulder strap webbing to said inner cover. The outer cover 40 is similar in shape and material to cover 41, and a line of stitching 68 securely attaches said outer cover and the inner edge of chest strap webbing 39a. The lap section structure is stitched to both covers and, in addition, lines of stitching 69, near the top, 70, at one side, and 71, at the other side, are applied through the panel.

The warp threads 72 of the inner or back cover 41 extend outward and downward from the line of stitching 67, so as to be oblique to the vertical center of the body as indicated by line 73. These warp threads, therefore, provide direct means for transmitting forces between the inner edge of the shoulder strap and the upper edge of the lap section structure. The edgewise curve of the shoulder strap is thereby restrained. The bias of the fabric of cover 41 is, therefore, parallel to the mentioned line 73. The warp 74 of the outer or front cover 40 is similarly obliquely arranged but, in this case, tied into the stitching 68 of the chest strap 39a. Consequently, the covers 40 and 41 are adapted to stretch vertically and thereby do not interfere with the straightening action of straps 38a and 39a when the latter are under load. The bias arrangement of the warp of the covers also permits them to adapt themselves to the spherical curvature of the body according to the shape of the latter.

It will be noted that the edgewise curve of shoulder strap 38a is less than that of chest strap 39a. The former extending along the side of the torso and out of line of the direct forces acting on said torso, is less subject to elongation or straightening and, therefore, assumes most of the thrust of said forces. The chest strap, being more sharply curved and extending diagonally across the forward side of the abdomen, is maintained by its upper connection to the shoulder strap to bear over the ribs at the lower edge of the chest. Said chest strap is adapted to bow forward to provide a firm yet yielding support, counteracting the forward forces of the internal organs on the wall of the abdomen. From Fig. 2, it will be seen that the chest straps of both panels cross each other over the forward part of the abdomen and the combined restraining action of these straps, together with the lap section structures of the two panels, produces a holding function that obviates distention of the abdominal wall. Since these overlapped or crossed chest straps are tied in, at their upper ends, to the less yielding shoulder straps, the forward abdominal wall is supported from above. Therefore, the organs of the abdomen are held up and the diaphragm is, thereby, adapted to properly receive the downward compressive forces on the organs of the thorax. The downward and rearward extensions from where the shoulder straps pass from the frontal area of the lower part of the chest, the attachment of said straps to the lap section, the holddown arrangement of straps 17, and the restraining action of the crossed chest straps over the abdomen, combine to maintain the torso in a normally erect attitude during impact.

It will be noted that the structure of the safety sling and its application to the body, provide that all of the load-bearing elements extend parallel to and are in engagement with the bony structure of the torso, or are bridged across the abdomen. The internal organs and the muscular wall of the torso are, thereby, relieved of shock caused by excessive depressing by said main load bearing elements.

A pocket 75 is provided to the rear of shoulder strap 38 somewhat above lap section 37. This pocket is located over the hollow area above the hips and is adapted to hold a suitable pad 76 to support and, thereby, prevent distention of the abdominal wall and protect the floating ribs against pressure from the internal organs. Suitable means may be provided to hold said pad in place. Similarly, a pocket 77 for a pad 78 is provided as protection for the clavicle or when necessary for leveling the area where the sling contacts the shoulder webbing and hardware of a parachute harness.

The releasable latch 30 shown in Fig. 3, comprises a latch-carrying element 79 and the mentioned latch link 50, the former being applied to panel 27 in the same manner as the link 59 is applied to panel 28. The link means 57, as hereinbefore indicated, are similarly relatively applied. Thus, two spaced points of one panel are connected to two similarly spaced points of the other panel.

In order to effect inter-connection of the pairs of elements 58 and 59, and 50 and 79, suitable openings, suggested at 80, are provided in the back cover of panel 27 and in the front cover of panel 28. Elements 58 and 59 are engaged by means of a tab extension 81 on element 58 that enters into an opening 82 in element 59. Similarly, a tab extension 83 on element 79 enters an opening 84 in element 50. The pull on the assembled panels, exerted through links 48, is such that the tab extensions 81 and 83 are pulled tightly into engagement with the elements that they enter. In addition, the pairs of elements are inter-connected by pin-and-hole 85 that resist lateral separation of said pairs of elements.

The latch release means 30 comprises a latch lever 86 pivotally carried by element 79 and provided with a tongue 87 adapted to engage in a keeper 88 formed in element 50. A spring 89 acts in a direction to hold tongue 87 in the keeper. It will be seen that when the right hand is moved across the front of the body and lifts latch lever 86, the tongue 87 thereof will be withdrawn from its keeper. Due to the opposed pull on connection links 48, element 79, on its extension 83 and element 58 on its extension 81, will pivot on the respective links 50 and 59 to effect separation of the pin-and-hole means 85 of both pairs of elements. Thus released, the pairs of elements will readily separate to effect complete separation of panels 27 and 28 which will then fall apart and release the person confined thereby. Upon release, the action is instantaneous and automatic, although the pairs of elements were initially firmly interlocked.

From Figs. 5 and 7, it will be noted that the narrowing of webbing 42 by folding the same longitudinally, permits the use of relatively narrow release elements 50, 79, 58 and 59, and yet retains the full strength of said webbing. Said pairs of elements, being located at two spaced points of the arch provided by the overlapped lap sections of both panels, the pull between the pairs of elements is in a straight line, and the pull between each pair and the link 48 adjacent thereto, is also in a straight line that is at an obtuse angle with respect to the line of pull between the pairs of elements.

The shield 47 that covers element 59 of panel 28 is not needed for the comparable end of panel 27, the arrangement being such that the latch end of element 79 is exposed to expose latch lever 86 for fingertip manipulation when release of the sling is to be effected.

The means 19 (Figs. 1 and 13) comprises an equalizer yoke 91 having a central pivot 92 for connection to the retrieving means 20, and equally spaced end pivots 93 connected to links 94 which, in turn, connect to straps 17. When in the same horizontal plane, the pivots 93 are arranged to be above pivot 92. Consequently, any tilt on beam 91 that results from a greater pull on one strap 17 than on the other, will pull said strap inward as indicated by distances 95 and 96, the former foreshortening as the pull on its connecting strap increases. Since the other strap is tautened, a twisting or bias force on the body is equalized through the medium of beam 91 retaining full engagement of the sling with the body.

While the invention that has been illustrated and described is now regarded as the preferred embodiment, the construction is, of course, subject to modifications without departing from the spirit and scope of the inven-

Having thus described the invention, what is claimed and desired to be secured by Letters Patent is:

1. A safety sling of the character described comprising two similar, oppositely formed triangular fabric panels that are adapted to overlap across the abdomen of the user, a length of webbing longitudinally and transversely folded and thereby embodying in a plurality of plies arranged along the lower portion of each panel to comprise a lap-engaging section, the lap-engaging sections of the two overlapped panels together having an arched form adapted to train across the lap of the user, an anchor-connecting link on the outer end of each lap-engaging section, said links, thereby, being opposite and adapted to engage over and below the hips of the user, and two pairs of releasably connected elements connecting the overlapped panels, one element of each pair being connected to the end of the lap section that is opposite the anchor-connecting link and the other element of each pair being connected to an intermediate part of each respective lap-engaging section.

2. A safety sling of the character described comprising two similar, oppositely formed triangular fabric panels that are adapted to overlap across the abdomen of the user, a length of webbing longitudinally and transversely folded and thereby embodying a plurality of plies arranged along the lower portion of each panel to comprise a lap-engaging section, the lap-engaging sections of the two overlapped panels together having an arched form adapted to train across the lap of the user, an anchor-connecting link on the outer end of each lap-engaging section, said links, thereby, being opposite and adapted to engage over and below the hips of the user, two pairs of releasably connected elements connecting the overlapped panels, one element of each pair being connected to the end of the lap section that is opposite the anchor-connecting link and the other element of each pair being connected to an intermediate part of each respective lap-engaging section, and a finger-tip latch embodied in one pair of said elements.

3. A safety sling of the character described comprising two similar, oppositely formed triangular fabric panels that are adapted to overlap across the abdomen of the user and each panel having a lower section adapted to engage the lap of a user, means releasably connecting the panels in overlapped condition, an anchor-connecting link connected with each lap-engaging section, a concavely edge-curved shoulder strap connected to each lap-engaging section adjacent the link thereof and extending to the upper end of each panel, and a more sharply concavely edge-curved chest strap connected to the opposite end of each lap-engaging section and connected to the upper end of each respective shoulder strap.

4. A safety sling of the character described comprising two similar, oppositely formed triangular fabric panels that are adapted to overlap across the abdomen of the user and each panel having a lower section adapted to engage the lap of a user, means releasably connecting the panels in overlapped condition, an anchor-connecting link connected with each lap-engaging section, a concavely edge-curved shoulder strap connected to each lap-engaging section adjacent the link thereof and extending to the upper end of each panel, a more sharply concavely edge-curved chest strap connected to the opposite end of each lap-engaging section and connected to the upper end of each respective shoulder strap, and diagonally disposed tie means connected to and extending between intermediate portions of the lap-engaging section and the shoulder strap of each of said panels.

5. A safety sling for a person sitting in a seat, comprising two woven fabric panels that are adapted to overlap across the front of a person sitting in the seat, means releasably connecting the panels in overlapped condition, means connected to hold down the lower portions of the respective panels, and shoulder straps connecting with the upper portions of the respective panels, the fabric of the panels being arranged with the threads thereof on a bias with regard to the height of a person wearing the safety sling, to permit yielding of the sling under pressure of a person thrown forward in the sling.

6. A safety sling for a person sitting in a seat, comprising two woven fabric panels that are adapted to overlap across the front of a person sitting in the seat, means releasably connecting the panels in overlapped condition, means connected to hold down the lower portions of the respective panels, overlapping chest straps fastened to the panels, and straps fastened to the panels and connecting shoulder portions thereof with the said lower portions along the sides of the panels, the panels having outer and inner fabric covers connected respectively with the chest straps and with the side straps, the threads of the fabric of the covers being arranged on a bias with regard to the height of a person wearing the safety sling.

7. In a sling of the character described, a triangular body-retaining fabric panel, a lower transverse lap section provided in said panel and comprising a base portion of said triangular panel, a connecting link for said panel at one apical end of the lap section, one of a pair of release elements at the other apical end of said section, and one of a second pair of release elements at an intermediate portion of said lap section.

8. In a sling of the character described, a body-retaining fabric panel, a lower transverse lap section provided in said panel, said lap section being transversely folded to comprise an intermediate connecting portion extending between the opposite ends thereof and end portions angularly directed toward each other and angularly disposed with respect to the intermediate portion, said portions of the lap section being superimposed and stitched together, a connecting link for said panel at one end of the lap section, one of a pair of release elements at the other end of said section, and one of a second pair of release elements at an intermediate portion of said lap section.

9. In a sling of the character described, a body-retaining fabric panel, a lower transverse lap section provided in said panel, said lap section being transversely folded to comprise an intermediate connecting portion extending between the opposite ends thereof and end portions angularly directed toward each other and angularly disposed with respect to the intermediate portion, said portions of the lap section being superimposed and stitched together to provide a loop at each end of the lap section and a loop at the end of each angularly directed portion, a connecting link for the panel in one end loop of the lap section, one of a pair of release elements in the other end loop of the lap section, and one of a second pair of release elements connecting the loops of the angularly directed portions.

10. A panel of a safety sling of the character described comprising a lower transversely arranged lap-engaging section, means to anchor one end of said lap section, means adapted to releasably connect the other end of the lap section for pull in the opposite direction, a concavely edge-curved shoulder strap extending upward from said one end of the lap section, a more sharply edge-curved chest strap extending upward from said other end of the lap section and connected to the upper end of the shoulder strap, an integral extension on said shoulder strap beyond the connection with the chest strap and adapted to be anchored to pull in a direction transverse to the pull on the ends of the lap section, and fabric means interconnecting the lap section and the shoulder and chest straps whereby tendency of the shoulder strap to straighten under pull is resisted by the lap section.

11. A panel of a safety sling of the character described comprising a lower transversely arranged lap-engaging section, means to anchor one end of said lap section, means adapted to releasably connect the other end of the lap section for pull in the opposite direction, a concavely edge-curved shoulder strap extending upward from said one end of the lap section, a more sharply edge-curved chest strap extending upward from said other end of the lap section and connected to the upper end of the shoulder strap, an integral extension on said shoulder strap beyond the connection with the chest strap and adapted to be anchored to pull in a direction transverse to the pull on the ends of the lap section, and fabric means interconnecting the lap section and the shoulder and chest straps whereby tendency of the shoulder strap to straighten under pull is resisted by the lap section, said fabric means comprising diagonal fabric ties connecting the lap section and the shoulder strap and inner and outer woven fabric covers having the warp thereof arranged on a bias.

12. A generally triangular safety sling panel comprising a lap section formed of a length of longitudinally, longitudinally-angularly and transversely folded webbing, said section extending transversely along the lower end of the panel; a chest strap section formed of a triangular piece of fabric and a concavely edge-curved length of webbing stitched along one side edge of said piece of fabric; and a shoulder strap section formed of a second triangular piece of fabric and a second concavely edge-curved length of webbing stitched along one side edge of said latter piece of fabric, the two triangular pieces of fabric being superimposed with the lap section therebetween and the two lengths of edge-curved webbings extending from opposite ends of the lap section to the opposite apex of the panel.

13. A safety sling of the character described, comprising two separate similar and oppositely formed triangular fabric panels adapted to overlap across the abdomen of the user, the lower portion of each panel comprising the base of its triangular form and said bases of the panels constituting the overlapping and abdomen-engaging portions of the panels, the upper extension of each panel being reducingly tapered from its base toward its upper end to constitute a side chest-engaging portion, a shoulder strap extending from the upper end of each said extension, each base portion including a lateral extension on the outer end arranged to extend across and downwardly over the outside of the user's thighs, anchor means for the sling connecting with said lateral extensions, and releasable means connecting the two panels.

14. A safety sling according to claim 13: restraining straps extending substantially along the lines of the outer lateral edges of the panels between the anchor means and the respective shoulder straps and disposed at an angle to said lateral extensions, said restraining straps cooperating with the anchor means and shoulder straps to hold the overlapped portions of the sling panels firmly engaged across the abdomen.

15. A safety sling of the character described, comprising two similar oppositely formed triangular fabric panels having shoulder straps extending from the upper ends thereof, the lower portion of each panel comprising the base of its triangular form, said lower portions of the panels being adapted to overlap and be arranged in position to engage over the abdomen of the user, a length of webbing longitudinally and transversely folded and, thereby, embodying a plurality of plies arranged along each said lower portion of the panels to constitute a nonstretchable and reinforced lap-engaging and restraining section, the said sections comprising the overlapping lower portions of the panels and, in their overlapping arrangement, combining to have an arched form adapted to train across the lap and downwardly along the outside of the thighs of the user, and means releasably connecting said panels and located to connect the lap-engaging and -restraining sections.

16. In combination with a safety sling according to claim 15: an anchor-connecting link on the outer lateral end of each lap-engaging and -restraining section.

References Cited in the file of this patent

UNITED STATES PATENTS

| | | |
|---|---|---|
| 1,156,381 | Thayer | Oct. 12, 1915 |
| 2,170,703 | Waxman et al. | Aug. 22, 1939 |
| 2,192,109 | Smith | Feb. 27, 1940 |
| 2,275,450 | Manson | Mar. 10, 1942 |
| 2,342,420 | Miner | Feb. 22, 1944 |
| 2,521,203 | Cotton | Sept. 5, 1950 |
| 2,587,307 | Garduno | Feb. 26, 1952 |

FOREIGN PATENTS

| | | |
|---|---|---|
| 180,866 | Great Britain | June 8, 1922 |
| 312,718 | Great Britain | June 6, 1929 |